United States Patent
Giovannini et al.

(10) Patent No.: US 12,443,879 B2
(45) Date of Patent: Oct. 14, 2025

(54) MODIFICATION AND GENERATION OF CONDITIONAL DATA

(71) Applicant: International Business Machines Corporation, Armonk, NY (US)

(72) Inventors: Andrea Giovannini, Zurich (CH); Frederik Frank Flöther, Schlieren (CH); Patrick Lustenberger, Herrliberg (CH); David Ocheltree, Peachtree City, GA (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 17/664,239

(22) Filed: May 20, 2022

(65) Prior Publication Data

US 2023/0376829 A1    Nov. 23, 2023

(51) Int. Cl.
*G06N 20/00* (2019.01)

(52) U.S. Cl.
CPC ..................... *G06N 20/00* (2019.01)

(58) Field of Classification Search
None
See application file for complete search history.

(56) References Cited

U.S. PATENT DOCUMENTS

| | | | |
|---|---|---|---|
| 12,094,451 B1 * | 9/2024 | Zhang | G10L 13/047 |
| 12,229,632 B2 * | 2/2025 | Macready | G06N 7/01 |
| 12,361,260 B2 * | 7/2025 | Yee | G06N 3/088 |
| 2014/0163962 A1 * | 6/2014 | Castelli | G06F 40/216 |
| | | | 704/9 |
| 2018/0165554 A1 | 6/2018 | Zhang | |
| 2019/0236148 A1 * | 8/2019 | DeFelice | G06N 3/047 |
| 2020/0110809 A1 | 4/2020 | Defelice | |
| 2020/0265324 A1 * | 8/2020 | Ferreira Moreno | G06N 5/022 |
| 2021/0224929 A1 * | 7/2021 | Bajaj | G06Q 10/0875 |
| 2021/0279279 A1 * | 9/2021 | Appel | G06N 20/00 |
| 2022/0179910 A1 * | 6/2022 | Bharathy | G06N 3/08 |
| 2022/0230078 A1 * | 7/2022 | Matlick | G06N 5/04 |

(Continued)

FOREIGN PATENT DOCUMENTS

| | | |
|---|---|---|
| CN | 106663383 B | 4/2020 |
| JP | 2018124432 A | 8/2018 |

OTHER PUBLICATIONS

"COCO Explorer", Common Objects in Context, COCO 2017, Accessed Jan. 19, 22, 1 page, <https://cocodataset.org/#explore>.

(Continued)

*Primary Examiner* — Eliyah S. Harper
(74) *Attorney, Agent, or Firm* — Kelsey M. Skodje

(57) ABSTRACT

A processor may gather raw data comprising a plurality of characteristic data samples of a target user group. The processor may categorize the characteristic data samples into a plurality of user-related classes and triggers. The processor may build an input property graph for each characteristic data sample. The processor may augment the input property graph by a concept of hierarchies. The processor may determine a modification vector from the augmented input property graph. The processor may train an encoder/decoder combination machine-learning system. An embedding vector and a modification vector are used as input for the decoder to build a trained machine-learning generative model.

20 Claims, 8 Drawing Sheets

(56) References Cited

U.S. PATENT DOCUMENTS

| | | | |
|---|---|---|---|
| 2023/0087667 A1* | 3/2023 | Dash | G06N 3/08 706/20 |
| 2023/0118240 A1* | 4/2023 | Wong | G06N 3/08 705/44 |
| 2024/0087558 A1* | 3/2024 | Oplustil Gallegos | G10L 13/08 |
| 2024/0177180 A1* | 5/2024 | Perera | G06Q 30/0202 |

OTHER PUBLICATIONS

Cowen, et al., "Self-Report Captures 27 Distinct Categories of Emotion Bridged by Continuous Gradients", PNAS, Psychological and Cognitive Sciences, Research Article, Sep. 5, 2017, 10 pages, <https://www.pnas.org/doi/10.1073/pnas.1702247114>.

Fan, et al., "Conditional Labeled Graph Generation With GANs," Published as a conference paper at ICLR 2019, 6 pages, <https://rlgm.github.io/papers/22.pdf>.

Kim, et al., "CT-GAN: Conditional Transformation Generative Adversarial Network for Image Attribute Modification", ECCV-18 submission ID 201, arXiv:1807.04812v1, Jul. 12, 2018, 17 pages.

Lim, et al., "Molecular generative model based on conditional variational autoencoder for de novo molecular design", Journal of Cheminformatics, vol. 10, Article No. 31, Jul. 11, 2018, 9 pages, <https://jcheminf.biomedcentral.com/articles/10.1186/s13321-018-0286-7>.

Lin, et al., "Microsoft COCO: Common Objects in Context", arXiv:1405.0312v3, Feb. 21, 2015, 15 pages, <https://arxiv.org/abs/1405.0312>.

Lindt, et al., "Facial Expression Editing with Continuous Emotion Labels", IEEE Preprint . Jun. 2020, ®2019 IEEE, 9 pages, <https://www.researchgate.net/publication/342376900_Facial_Expression_Editing_with_Continuous_Emotion_Labels>.

Martin, Marvin, "Emotion-Based Art Generation Using C-GAN", Towards Data Science, Sep. 7, 2021, 6 pages, <https://towardsdatascience.com/emotion-based-art-generation-using-c-gan-de9abed6fa2f>.

Morse, Gardiner, "Decisions and Desire ", Harvard Business Review, Jan. 2006, 17 pages, <https://hbr.org/2006/01/decisions-and-desire>.

Otamendi, et al., "The Emotional Effectiveness of Advertisement", Frontiers in Psychology, vol. 11, Article 2088, Sep. 2020, 12 pages, <https://www.frontiersin.org/articles/10.3389/fpsyg.2020.02088/full>.

Yang, et al., "Conditional Structure Generation through Graph Variational Generative Adversarial Nets", 33rd Conference on Neural Information Processing Systems (NeurIPS 2019), 12 pages, <https://www.cs.emory.edu/~jyang71/files/condgen.pdf>.

* cited by examiner

MODIFICATION AND GENERATION OF CONDITIONAL DATA

BACKGROUND

The disclosure relates generally to training methods for conditional data modification and to a related inference method. The disclosure relates further to a training system for conditional data modification and a related inference system, as well as related computer program products.

Current techniques for training systems associated with conditional data modification are rarely used to identify and classify sentiment. Such methods often rely on limited information such as audible or visual expressions of a person captured on a device (e.g., facial expressions and tone of voice captured). Because of this limited information, it is often difficult to correctly identify a person's sentiment or combination of sentiment. As such, predicting what kind of response or reaction a particular user or group of users may have to a particular stimuli (e.g., image, text, etc.) can be even more difficult.

SUMMARY

According to one aspect of the present disclosure, a computer-implemented training method for conditional data modification and a related computer-implemented inference method may be provided. A processor may gather raw data comprising a plurality of characteristic data samples of a target user group. The processor may categorize the characteristic data samples into a plurality of user-related classes and triggers. The processor may build an input property graph for each characteristic data sample. The processor may augment the input property graph by a concept of hierarchies. The processor may determine a modification vector from the augmented input property graph. The processor may train an encoder/decoder combination machine-learning system. An embedding vector and a modification vector are used as input for the decoder to build a trained machine-learning generative model.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
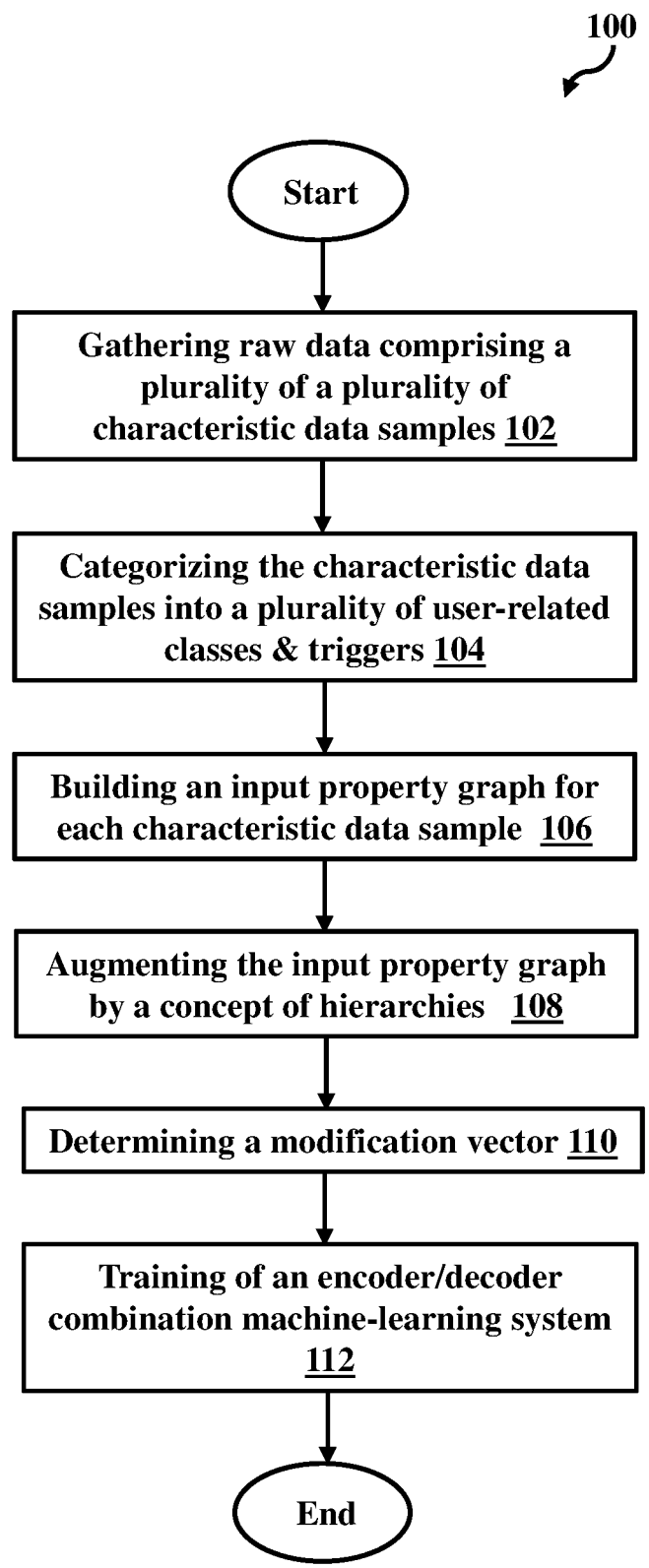
FIG. 1 shows a block diagram of an embodiment of the proposed computer-implemented training method for conditional data modification and portions of a related computer-implemented inference method, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

In the context of this description, the following conventions, terms and/or expressions may be used:

The term "conditional data modification" may denote a change of received data under predefined boundary conditions. The change or modification is not limited to—in case of image data—single pixel changes or changes to a small group of pixels if compared to the overall number of pixels of the image but to the complete scene of the image. A convolutional neural network (CNN) may be built using software or, it may also be realized entirely in hardware or, a combination thereof.

The term "raw data" may denote data received, collected or gathered from various sources like social media, search engine results, emails, chat data and so on; basically, each type of information in any form regarding a person or a group of people may be used.

The term "characteristic data sample" may exemplary denote a typical image—in particular in case the data are related to an image—for a person in an identifiable sentimental state. Such data may in particular be of importance during the training period. However, the concept proposed here is not limited to image data only, as mentioned several times.

The term "target user group" may denote a group of people or a single person for which the underlying machine-learning system may be trained. The target user group may differentiate between different cultures or, sub-groups within a culture having common characteristics, such as those belonging to a predefined age group, fans of a specific football club, inhabitants of a city or county, and so on.

The term "user-related class" may denote a category into which attributes of the target user group may be categorized. Such categorization may emphasize predefined sentimental states.

The term "trigger" may denote in the context of this document detectable initiating impulses for, e.g., an sentimental status, another characterial trigger (e.g., character depending), a recognizable relationship between a person (or a group of people) and another person or a person and an activity, and the like.

The term concept of hierarchies or concept hierarchy may define a sequence of mappings for a set of low-level concepts or higher-level, more general concepts. Concept hierarchies may allow specialization, or drill down, replacing of concept values with lower-level concepts. Thereby, the hierarchy may be an organization and structure in which items are ranked according to levels of importance. In order to lower the depths of the hierarchy, binning may be used in computer science for this task. However, in the context of this document it may be more important to determine higher-level, more abstract concepts linking to more items defining a relationship between the items. Ontology data may be used to identify such higher-level more abstract concepts. As an example, for the items father, mother, child, a higher-level more abstract item would be "family".

The term modification vector may denote a vector of numerical data used to influence the functioning of the encoder/decoder combination in order to change the appearance of input data in a predefined way such that the output data of the machine-learning system reflect the intention underlying the modification vector.

The term augmented input property graph may denote an amended graphical representation of data items at least partially related to one other. The property graph may be organized as a knowledge graph wherein each node represents certain data of the group of raw data. During the process of augmentation, additional nodes and/or edges—e.g., relationships between nodes—may be added to the input property graph thereby building the augmented input property graph.

The term encoder/decoder combination machine-learning system may denote a sort of computerized system which is not programmed in a procedural way but which behavior may be determined by training using training data as input and ground truth data so that the generated output data may be as close as possible to the ground truth data. In the case of an encoder/decoder combination, input data may be transformed by the encoder to a data vector which may then be decoded again into a representation of data type that is equivalent to the data type of the input data. Thereby, the data vector—e.g., the embedding—in between the encoder and decoder may be amended in order to influence dynamically that behavior of functioning of the machine-learning system in a desired way.

The term model optimization process may refer to the machine-learning model building the basis for the encoder/decoder combination machine-learning system. The model optimization process may be important during the training phase of the machine-learning system in order to train the model so that during the inference phase the desired output may be generated. One of the techniques used for the model optimization process may be—among others—back propagation.

The term target modified sample may denote a data sample or a plurality thereof used as ground truth for a combination of a characteristic data sample together with an input property graph or data derived there from, e.g., an embedding vector. As an example, if the characteristic data sample as input may show a depressing image, the augmented input property graph may represent—at least in parts—a euphoric sentiment, and then the target modified sample may show an image expressing some form of excitement.

The term convolutional neural network (CNN) may denote a mesh of nodes of a certain mathematical function organized in layers, wherein the nodes of the layers may be selectively or completely linked to nodes of the next—e.g., downstream—layers of the network. Each of the links or edges between nodes may carry a weight value which may be determined during the training phase of the CNN. The term convolutional may indicate that the neural network has a special form and function, most commonly applied to analyze visual imaginary. Typically, they are based on the shared-weight architecture of the convolution kernels of filters that slide along input features and provide translation equivariant responses known as feature maps.

The term Resource Description Framework (RDF) may denote a nomenclature known as a World Wide Web Consortium (W3C) standard originally designed as a data model for metadata. RDF is typically a directed graph composed of triplet statements. The three components relate to two nodes and a linking hatch between the two nodes. Each of the three components may carry certain attributes.

The term graph neural network (GNNs) refers to known deep learning based methods that operate on graph domain. Due to its convincing performance, GNN has become a widely applied graph. In the context of the proposed methods and systems, GNNs are used to aggregate the node embedding vectors (e.g., embeddings) in a way that follows the connectivity of the input property graph.

In the following, a detailed description of the figures will be given. All instructions in the figures are schematic. Firstly, a block diagram of an embodiment of the proposed computer-implemented training method for conditional data modification and a related computer-implemented inference method is given. Afterwards, further embodiments, as well as embodiments of the training system for conditional data modification and a related inference system will be described.

FIG. 1 shows a block diagram of a preferred embodiment of the computer-implemented training method 200 for conditional data modification and a related computer-implemented inference method. The training method 100 comprises gathering 102—e.g., in the sense of collecting data already available—raw data comprising a plurality of characteristic data samples. A practical example is best imagined if the characteristic data samples are images of a target user group which can also be a single user. The proposed methods also work for other data types, such as audio data, text, video streams, infographics, etc.

One good and practical source for the raw data are social media. Here, the data are freely available and also relationships to other users as well as to objects, about which is written, may easily be derivable.

Once the characteristic sample data—for a single person and, in particular, for a group of users—are available, the method 100 comprises categorizing 104—in particular, and/or classifying—the characteristic data samples into a plurality of user-related classes and triggers. The classes and triggers can, in particular, be interpreted as sentiment classes and/or characterial triggers. They may in particular comprise objects, events, experiences, and/or stories of/about a user or a group of users.

Furthermore, the method 100 comprises building, 106, an input property graph for each characteristic data sample. For this, the raw data, social media as well as any other available input data can be used. Thereby, the input property graph comprises data relationships between characterial triggers, e.g., sentiment triggers (or better related IDs, e.g., identifiers), user identifiers, object identifiers and activity identifiers. More categories may easily be added. Of particular interest may be hierarchical relationships between the objects.

Next, the method 100 comprises augmenting, 108, the input property graph using a concept of hierarchies. Thereby, the augmented input property graph is built which typically comprises additional abstract nodes which have been derived by an external ontology which builds the basis for the concept of hierarchies.

A further process step of the method 100 is related to determining, 110, a modification vector from the augmented input property graph, and training 112 of an encoder/decoder combination machine-learning system. Also here, certain conditions apply: The characteristic data samples are used as input data to the encoder to generate an embedding vector, and the embedding vector, along with the modification vector, is then used as input to the decoder to build a trained machine-learning generative model. Here, it should be understood that the machine learning generative model is a combined model of the decoder and the encoder. As output of the decoder—e.g., the combined machine-learning mode—is a modified data sample relating to one of the characteristic data samples, e.g., the one that was used as input for the encoder.

A model optimization process for the machine-learning model uses target modified samples as ground truth relating pairwise—e.g., in a 1:1 fashion—to the modified data samples of the output of the machine-learning generative model under training. Thereby it should not be forgotten that as additional training input data the modification vector is required to make the method work.

Figure 2:
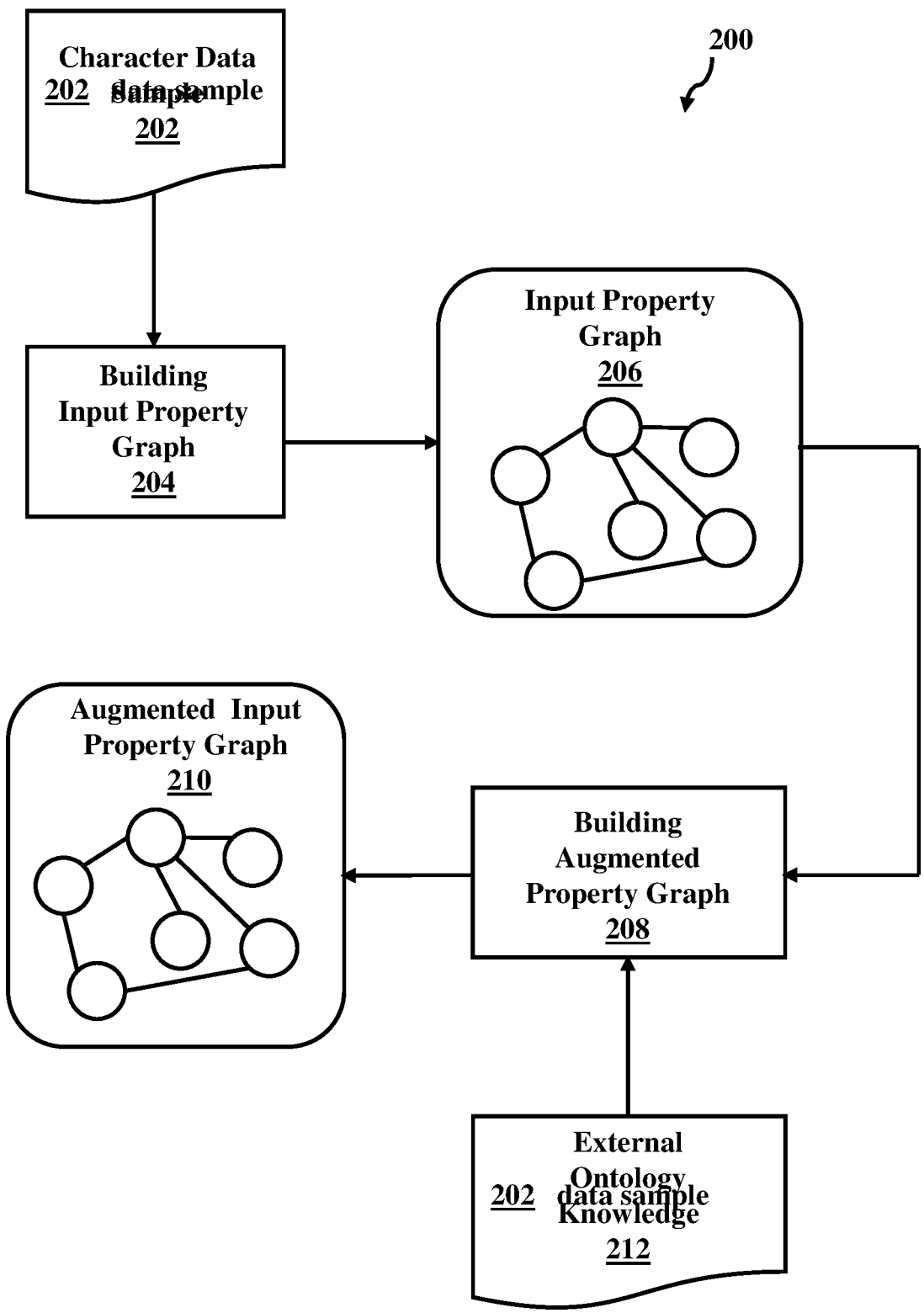
FIG. 2 shows a block diagram of an embodiment of building the augmented input property graph, in accordance with embodiments of the present disclosure.

FIG. 2 shows a block diagram 200 of an embodiment of building the augmented input property graph 210. The process starts with the characteristic data sample(s), as well as the other data gathered. Based on a categorization of recognized items in the characteristic data sample—and potentially also in the other raw data—the input property graph 206 is built, 204. Using external ontology knowledge 212 and applying the concept of hierarchies, an augmented input property graph 210 is built, 208. This may represent the basis for an instrumental process of the here presented methods (and systems).

Figure 3:
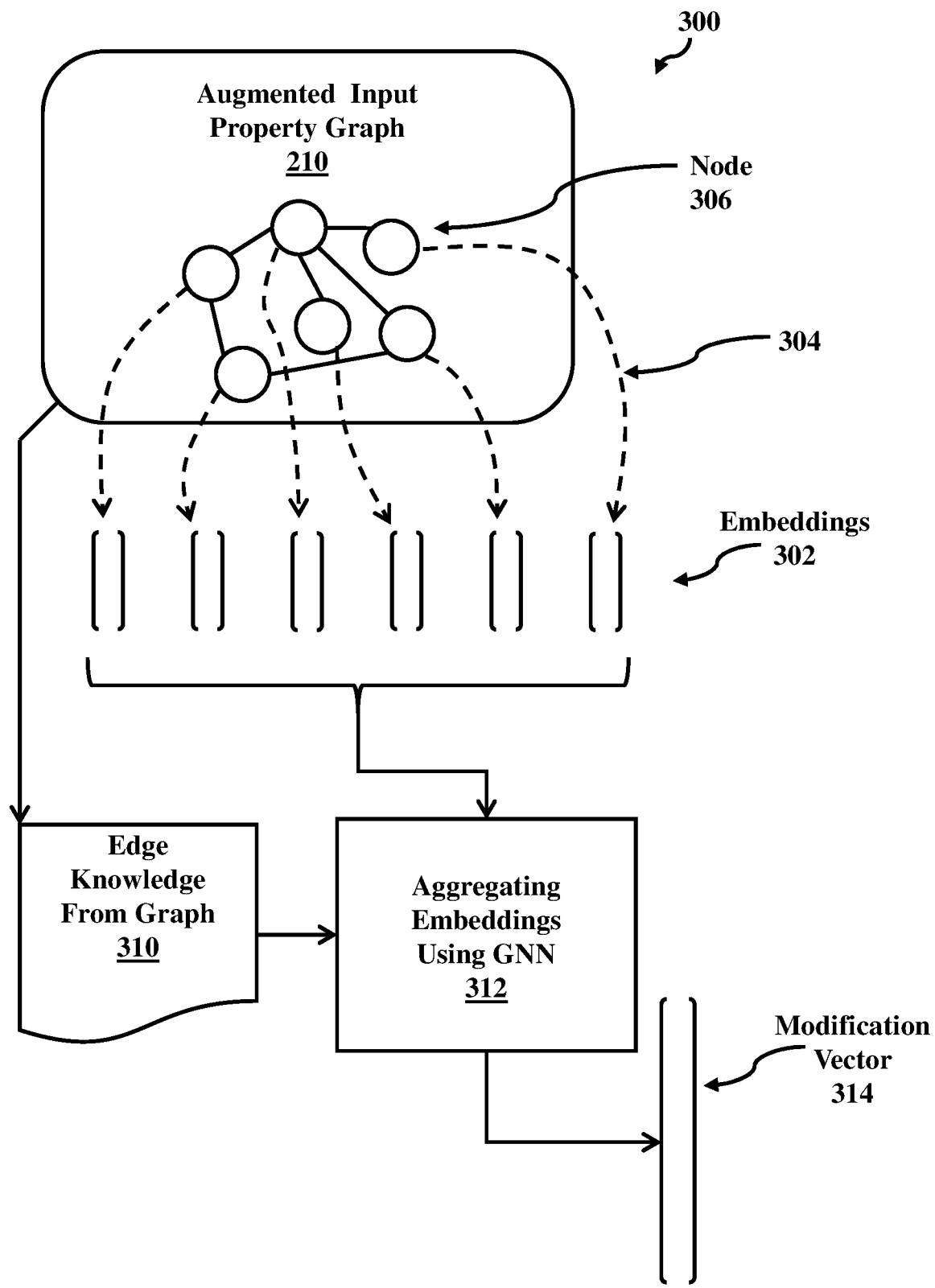
FIG. 3 shows a block diagram of one specific embodiment to build the modification vector, in accordance with embodiments of the present disclosure.

FIG. 3 shows a block diagram of one specific embodiment 300 of a plurality of options to build the modification vector 314 from the augmented input property graph 210. Once the augmented input property graph 210 comprising a plurality of nodes 306 and edges (without reference numerals) is determined and augmented, each graph node is associated, 304, with an embedding 302 (e.g., an embedding vector) which can either be chosen (reproducible) randomly or be derived from a word embedding method, e.g., BERT (bidirectional encoder representation from transformer), e.g., transformer-based machine-learning techniques for natural language processing.

Furthermore, FIG. 3 shows that the embeddings 302 are aggregated, 312 using a trained GNN (graph neural network, wherein the edge information 310—in particular, the weights of the edges of the augmented input property graph 210—are used). The output of the step of aggregating the embeddings 302 is the modification vector 314. This vector 314 will be used in the next figure to extend the embedding vector generated by the encoder of the encoder/decoder combination machine-learning model system.

Before coming to that step, also alternatives for building the modification vector 314 shall be described:

Firstly, the modification may be built by a concatenation of the graph embeddings in RDF format, for example concatenating (e.g., eN1/eN2, eN1/eN3, . . . , assuming a graph with the following edges: N1-N2, N1-N3). This step can produce a vector of the mention N*M, where N is the embedding the dimension and M is the number of edges and the graph. It should also be mentioned that the graph embedding, e.g., the modification vector, should not dominate (being larger than in terms of dimensions) over the dimension of the latent space (e.g., the space of the embedding vector being output by the encoder), in order to reduce the graph embedding dimension, auto encoders or PCA (Principal Component Analysis) can be used before the concatenation and passing the selector to the decoder (see below in FIG. 4).

As second alternative and, already partially being described in the context of FIG. 3, a graph neural network (GAN) is used to aggregate the embeddings of the nodes of the input property graph. For this, the GNN previously trained to distinguish between scenes (e.g., by using visual genome dataset) is used here until the aggregation of the message passing and averaging between the graph nodes (e.g., similar to a graph classification task) it achieves one vector which—as in the method described before—is passed to the encoder.

Thereby, the message passing $H_i$ feature for node i, $W_{(l)}$ filter for layer l, in the neighborhood N(i) can be expressed as $H_i^{(l+1)} = \sigma[\Sigma_{j \in N(i)} H_j^{(l)} W^{(l)}]$, where $W^{(l)}$ is a learnable parameter, in this case, coming from training by a general dataset. After the message passing operations, a tensor remains with dimension V×N×R, where V is the number of nodes, N is the embedding dimension and R is the relation type, in case the original graph divides relations based on semantics, e.g., a parent2child relation and a belonging to relation.

The average node feature readout can be formulated as follows:

$$h_g = \frac{1}{|V|} \sum_{v \in V} h_v,$$

where $h_g$ is the final graph embedding injected in the latent space. As in the method above, if the dimension of $h_g$ is larger than the latent dimension, then a dimensionality reduction technique can be applied to transform $h_g$ in $h'_g$ with lower dimensionality.

Similar to the above—according to a third method to build the modification vector—the training method, also using a GNN, but here, allowing for adaptation of the GNN model to better distinguish between the available graphs. In order to achieve this, a training step of the GNN is introduced by classifying each graph based on combination of abstract nodes, meaning that a class is artificially defined by concatenating the abstract nodes available in each graph. For example, all graphs comprising the abstract nodes Family and Time-off may constitute a class. During training, an additional fully connected layer is added to the neural network to compute the class from $h_g$. After training, the last fully connected layer is discarded, and the embedding $h_g$ is computed and injected as in the modification vector building method just above.

According to a fourth partial method of building the modification vector and similar to the second option one can use the message passing only until the abstract nodes have been defined or identified. Then, the signals are aggregated and averaged only between the abstract nodes (instead of all nodes). This variation of the method can address possible noise from the singular nodes, which will get reduced in this way. This means that the average computed in the above is done on the set of abstract nodes (e.g., Family and Time-off, instead of on all the nodes V.

Figure 4:
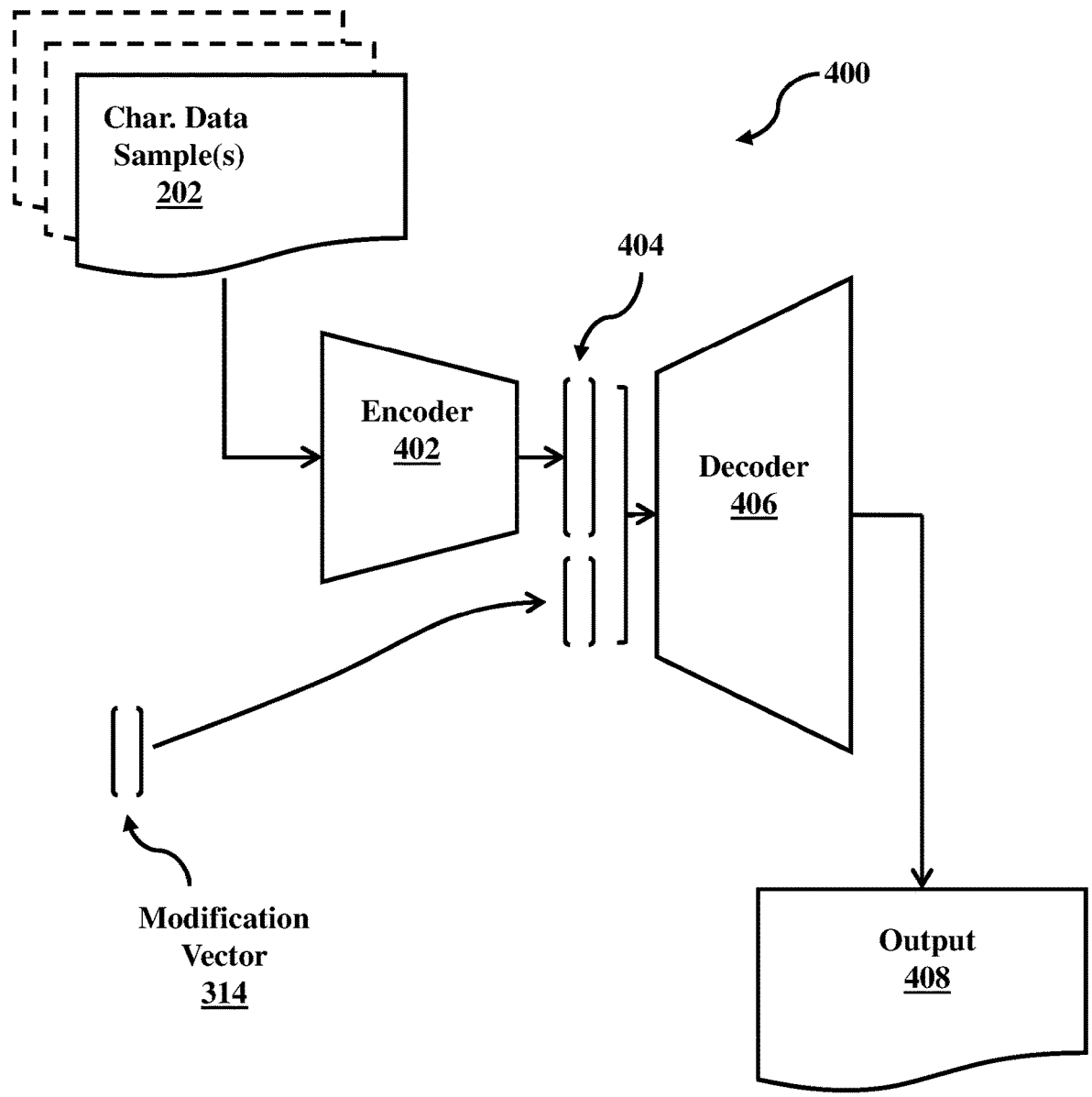
FIG. 4 shows a block diagram of an embodiment of central components of the proposed method, in accordance with embodiments of the present disclosure.

FIG. 4 shows a block diagram 400 of an embodiment of central components of the proposed method and system, respectively. During an initialization, the raw data are gathered and characteristic data samples 202 are extracted. Furthermore, during a pre-processing of the gathered raw data, the input property graph and the augmented input property graph are built using the hierarchy of concepts as discussed above, in particular in the context of FIG. 3.

During training of the encoder 402 and the decoder 406 of the combined encoder/decoder machine-learning system, the characteristic data samples as well as the augmented input property graph, e.g., the resulting modification vector 314, are used. The characteristic data samples 202 are used as input for the encoder 402 and the modification vector 314 is injected into the embedding vector 404 generated by the encoder 402. Hence, the number of input nodes of the decoder 406 is at least the sum of the dimension of the embedding vector 404 and the dimension of the modification vector 314.

Under training conditions the combined machine-learning model underlying the encoder 402 and the decoder 406 predicts or creates an output 408. The data used during training comprises per cycle a characteristic data sample as input (e.g., an image), a target modification sample (e.g., an image or data of the same type as the input), and the augmented input property graph, or more concrete, the derived modification vector 314. The optimization of the combined machine-learning model is done such that the actual output is as close as possible to a ground truth output data (e.g., an image). This feedback loop is not shown in FIG. 4.

The general setup of the system during inference time is basically the same as just discussed. However, a request is not made of an input data sample and an input property graph which is modified to become an augmented input property graph using the already discussed hierarchy of concepts. In these embodiments, the underlying theory may be injected into the system via the modification vector 314. This may be a consequence of the conditional input property graph. Thus, as the input data are fed to the encoder, the modification vector (e.g., the information from the input property graph in encoded form) is injected between the encoder 402 and decoder 406 and an output 408 is predicted or generated. This output 408 still relates to the input (e.g., actual data sample) but may have a more or less modified appearance because it now reflects also the query which is part of the modification vector 304 in encoded form.

Optionally, an additional feedback loop can be provided to modify and update the encoder/decoder combination based on user feedback about the correctness or quality of the predicted output 408.

Figure 5:
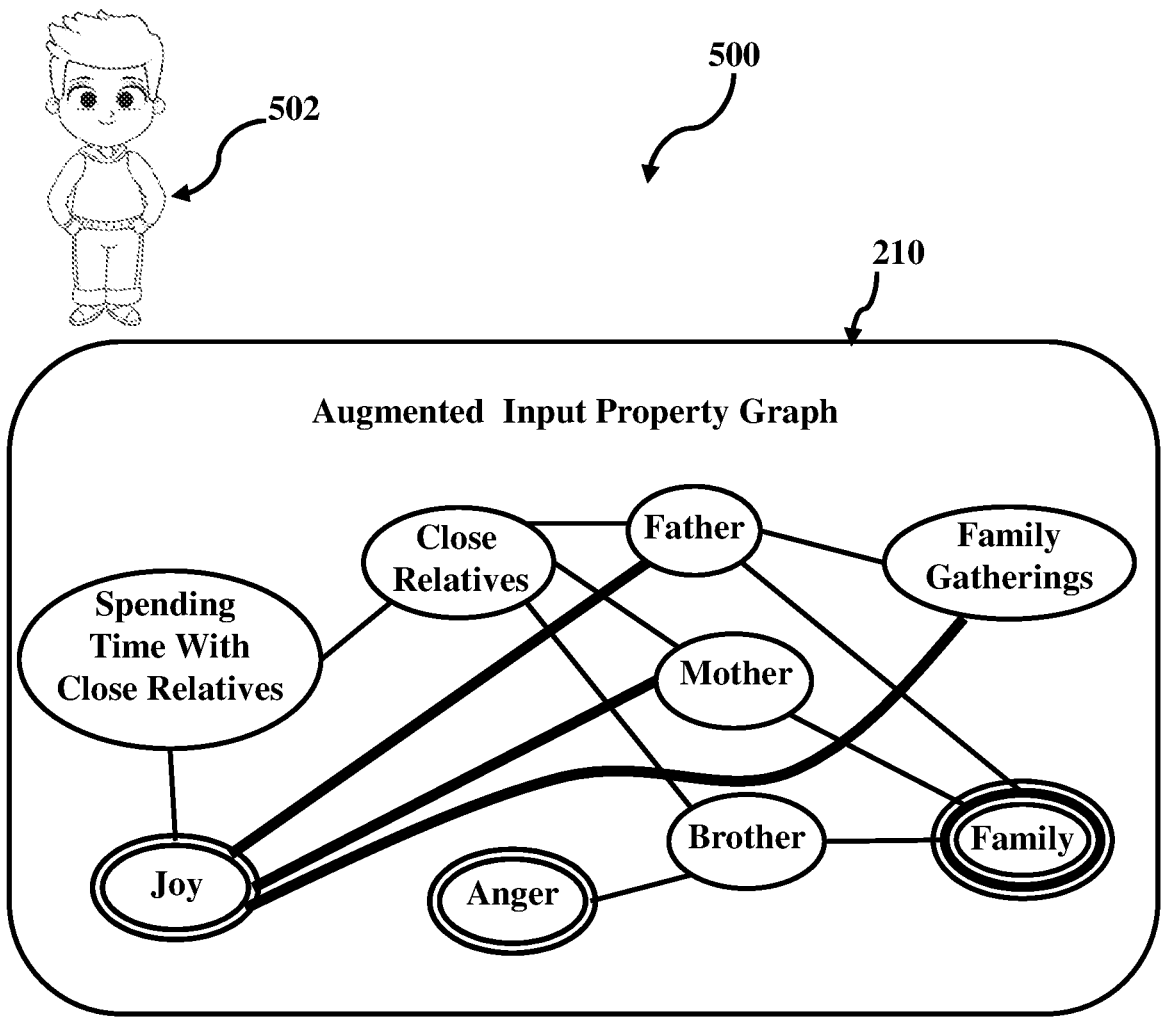
FIG. 5 shows an illustrative example of how the method and/or system can work in practice, in accordance with embodiments of the present disclosure.
Figure 5:
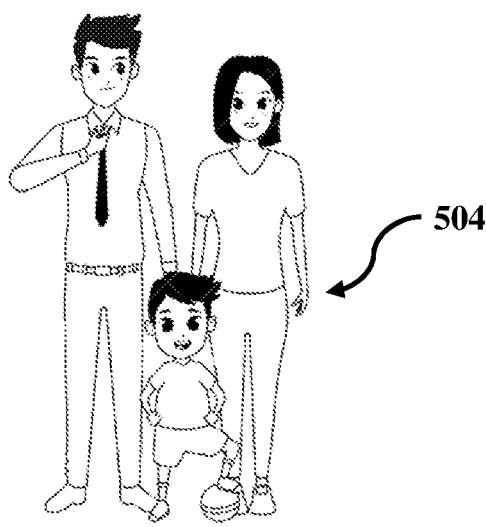

An illustrative example 500 of how the method and/or system can work shall be explained in the context of FIG. 5. Before describing details of FIG. 5, the underlying concept shall be discussed as a multiple operation process in the context of an exemplary use case.

In one operation, input data (e.g., characteristic data samples) of a group of users comprising one or more users may be gathered (e.g., Facebook®, email, LinkedIn®, wearable device data, news, Google®, etc.). The integrated can be image data, audio data, text data, video data, and/or a combination of those, and so on.

In one operation, the input data may be processed by categorizing sentiments (e.g., using 27 sentiment categories) and triggers and building a hierarchical graph (e.g., the input property graph or a type of "user profile"). The target condition graph can generally be any knowledge graph that provides additional information to the input data and includes a talent condition which can be interpreted as a query. Examples may include relationships between solid sentiments and people, objects and activities, hierarchical information, etc.

In one operation, the encoder/decoder combination may be trained based on the input property graph. The collected input data (e.g., images) and associated hierarchical sentiment-trigger graphs are used. The input image is presented for the model, derived data from the graph are injected into the embedding generated by the encoder. The model may then create or predict the output image. The predicted output image may be compared against a target output image (e.g., the ground truth).

In one operation, the processor may enter the inference phase. During the inference phase, a request may be received comprised of an input data sample and an input property graph. The request may come in different forms including, but not limited to: (i) the request could be (e.g., trying to evoke certain sentiments in the group of users or trying to spur of that group into taking a certain action, such as buying a specific product); (ii) the request may also comprise constraints, such as using content (e.g., the group's family, not family, or using certain "based data" such as an image) as spaces to be modified. In some embodiments, this may be used as opposed to generating entirely new content. In these embodiments, the output consists of modified based data. In these embodiments, the request may comprise modifying a base image in order to appeal more to the given group of users. In an alternative embodiment, if no based data is supplied or available, the system may generate a novel output that is not obtained through modifying based data.

In one operation, the augmented input property graph may use a hierarchy of concepts, leading to the condition graph (e.g., adding a node "family" linking to the nodes "brother" and "sister").

In one operation, the input image may be fed to the encoder, the condition graph may be applied, and decoding may occur to generate the output image.

In some embodiments, one operation may optionally a feedback loop. The feedback loop can be operative/used to update the encoder/decoder combination. More particularly, in some embodiments, the related combined machine-learning model may be based on user feedback to the output image predicted.

In this example, the training data set may be adapted depending on the usage of the system. For example, the extraction and interpretation of joy and/or other sentiments may vary from culture to culture. In order to address this, different machine-learning models may be trained, each machine-learning models may have a different training set comprised of only those samples which are consistent with the selected culture.

Returning now to FIG. 5, an example of an operation where the encoder/decoder combination may be trained based on the input property graph is depicted. In this example, the input data for the training is represented by the icon of the boy 502. The exemplary augmented input property graph 210 for the training for a person A is shown. The learning target or objective is to convey joy, associated nodes and the graph of person A are depicted (compare to the lower left node 'joy'). In this example embodiment, different line thickness between the nodes shown. The different line thickness between "father," "mother," and "brother" is depicted differently in comparison to the abstract nodes like "family," "family gatherings," "close relatives," and "spending time with close relatives."

During training, the training output data, in particular relating to the ground truth data, may be the image 504 of a family.

Figure 6:
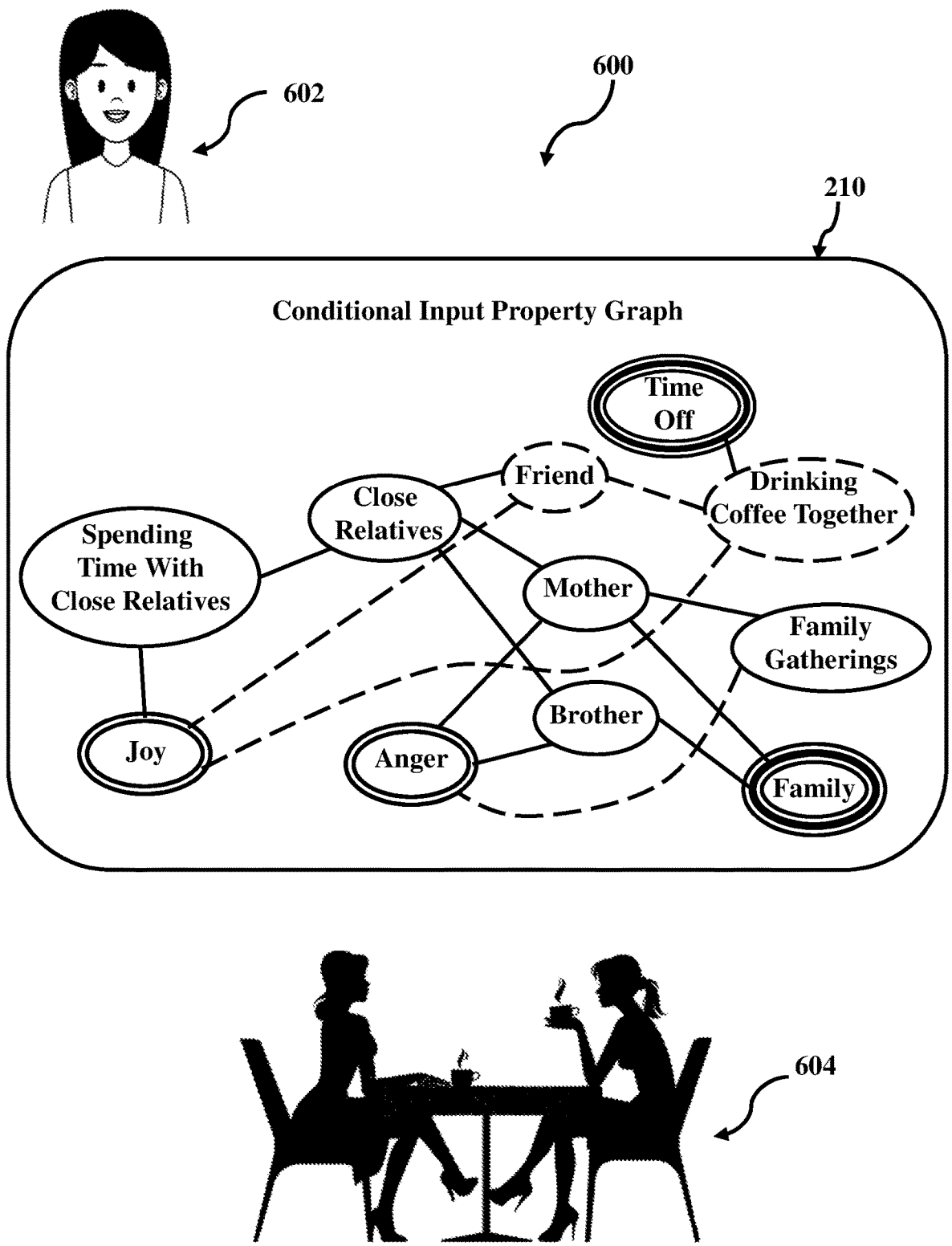
FIG. 6 depicts another example of another example of how the method and/or system can work in practice, in accordance with embodiments of the present disclosure.

Turning now to FIG. 6, diagram 600 is depicted and is associated to operations in production or inference time. The conditional input property graph 210 (e.g., the input property graph comprising the query "ear joy") may have modified edges as well as additional nodes (e.g., time off' and "drinking coffee together"). Also new edges appear in the conditional input property graph 210, as indicated as dashed lines.

Based on the exemplary training described above, the method and/or system may output an image 604, such as an image showing two friends drinking coffee in a café. In one example embodiment, the input picture from person A and the target condition graph for person B, delivering a blueprint to the model how to adapt/contextualize the presented image for person B, may be input to the trained machine-learning (ML) model. The trained ML model may interpret that in person B joy is not triggered by the family, but is triggered but by friends and outputs/predicts in an adapted image showing person with friends. In embodiments, an input sample image may only require a small modification (e.g., a sad-looking face is converted into a happy-looking face of the same person). In other embodiments, a completely different scenario may be generated as the output of the encoder/decoder combination.

According to one aspect of the present disclosure, a computer-implemented training method for conditional data modification and a related computer-implemented inference method may be provided. The training method may comprise gathering raw data comprising a plurality of characteristic data samples of a target user group, categorizing the characteristic data samples into a plurality of user-related classes and triggers, and building an input property graph for each characteristic data sample, wherein the input property graph comprises data relationships between characterial triggers, user identifiers, object identifiers and activity identifiers.

The training method may further comprise augmenting the input property graph by a concept of hierarchies, whereby an augmented input property graph is built, determining a modification vector from the augmented input property graph, and training of an encoder/decoder combination machine-learning system. Thereby, the characteristic data samples may be used as input data for the encoder to generate an embedding vector, wherein the embedding vector and the modification vector may subsequently be used as input for the decoder to build a trained machine-learning generative model, which output may be a modified data sample relating to one of the characteristic data samples, and wherein a model optimization process for the machine-learning model may use target modified samples as ground truth relating pairwise to the modified data samples of the output of the machine-learning generative model under training.

According to another aspect of the present disclosure, an inference method for conditional data modification and a related inference system may be provided. The inference method may comprise using inference input data and a conditional input property graph to be fed as input to a trained encoder/decoder combination machine-learning system for predicting output data of a same data representation as the inference input data wherein the conditional input property graph comprises a request for a target sentiment or target characterial trigger.

Thereby, the encoder/decoder combination machine-learning system may comprise a trained machine-learning generative model which may have been trained by using a plurality of characteristic data samples as input data for the encoder to generate an embedding vector, and using the embedding vector and a modification vector built from an augmented input property graph as input for the decoder. Additionally, the input property graph may comprise data relationships between target characterial trigger identifiers, user identifiers, object identifiers and activity identifiers may be augmented based on a concept of hierarchies to build the augmented input property graph.

Thereby, the embedding vector and the modification vector have subsequently be used as input for the decoder, which output may have been a modified data sample relating to one of the characteristic data samples, and wherein a model optimization process for the machine-learning model used target modified samples relating pairwise to the output as ground truth.

According to another aspect of the present disclosure, a training system for conditional data modification and a related inference system may be provided. The inference system may comprise a processor and a memory, communicatively coupled to the processor, wherein the memory stores program code portions that, when executed, enable the processor, to gather raw data comprising a plurality of characteristic data samples of a target user group, categorize the characteristic data samples into a plurality of user-related classes and triggers, build an input property graph for each characteristic data sample, wherein the input property graph may comprise data relationships between characterial triggers, user identifiers, object identifiers and activity identifiers.

The processor of the inference system may further be enabled to augment the input property graph by a concept of hierarchies, whereby an augmented input property graph may be built, determine a modification vector from the augmented input property graph, train an encoder/decoder combination machine-learning system.

Thereby, the characteristic data samples may be used as input data for the encoder to generate an embedding vector, wherein the embedding vector and the modification vector may subsequently be used as input for the decoder to build a trained machine-learning generative model, which output may be a modified data sample relating to one of the characteristic data samples, and wherein a model optimization process for the machine-learning model uses target modified samples as ground truth relating pairwise to the modified data samples of the output of the machine-learning generative model under training.

According to another aspect of the present disclosure, a training system for conditional data modification and a related inference system may be provided. The inference system may comprise a processor and a memory, communicatively coupled to the processor, wherein the memory stores program code portions that, when executed, enable the processor, to use inference input data and a conditional input property graph to be fed as input to a trained encoder/decoder combination machine-learning system for predicting output data of a same data representation as the inference input data, wherein the conditional input property graph comprises a request for a target sentiment or target characterial trigger.

Furthermore, the encoder/decoder combination machine-learning system may comprise a trained machine-learning generative model which has been trained by using a plurality of characteristic data samples as input data for the encoder to generate an embedding vector, and using the embedding vector and a modification vector built from an augmented input property graph as input for the decoder, wherein the input property graph may comprise data relationships between target characterial trigger identifiers, user identifiers, object identifiers and activity identifiers and may be augmented based on a concept of hierarchies to build the augmented input property graph, wherein the embedding vector and the modification vector may have subsequently been used as input for the decoder, which output has been a modified data sample relating to one of the characteristic data samples, and wherein a model optimization process for the machine-learning model used target modified samples relating pairwise to the output as ground truth.

The proposed computer-implemented training method for conditional data modification and a related computer-implemented inference method may offer multiple advantages, technical effects, contributions and/or improvements:

The technique proposed here may enhance the use of deep generative models firstly to "understand" certain sentiments and triggers by using a broad range of gather data, e.g., from social media networks or other publicly (sometimes also private) available sources in order to drive certain sentiments which have been influenced by the proposed inference system.

Thereby, the used input property graph may play an instrumental role because recognized relationships between (sentiment) triggers, user identifiers, object identifiers and activity identifiers in the combination with the concept of hierarchies relating to these objects (e.g., triggers, people, activity, other objects) may be used for the training of the encoder/decoder combination machine-learning system, wherein an embedding vector generated by the encoder may be extended by a modification vector which may be a function of the input property graph.

Hence, characteristic data samples of the training data may be enhanced—e.g., using the encoder decoder combination machine-learning system—with a "spin" derived from the input property graph. Thereby, a plurality of different partial methods may be possible to determine the modification vector used to generate this "spin".

The differentiation between the training method and the independent inference method may separate the training task from inference tasks. This may be advantageous because the computational effort required for a training of the machine learning model may be significantly higher than during the inference time. Hence, different systems for the training and inference may be used having significantly different computational power.

The proposed concept may enable a broad range of use cases which may include the following: optimized advertising as a service, cloud service to translate sentiments for specific end-users off-line (e.g., customizing a speech to a group of students before the real-life speech is made), real-time personalized translation of sentiments (e.g., a person talks about how happy he is and each listener is given a personal example to understand how glad the person is of something), learning services to enable users to accelerate learning and approve retention (e.g., associating certain vocabulary words and phrases with strong sentiments), conversion of sentiments between specific user groups (e.g., show how happy a person is when they receive a gift from another person), a diversity and inclusion virtual-reality platform that shows users how to "walk a mile in other peoples' shoes", a cultural education and communication platform that may translate how a specific event and one culture may affect a person's life and allowing a user to experience that same feeling in a "what if" scenario.

Thereby, the inference system may work in real-time. A last but not least example may be described: a presentation may be considered, where the presenter fails to connect with the audience. Cues from the audience, e.g., checking smart phones during a particular boring part of the presentation could form the user-specific input data (e.g., the characteristic data sample or pattern). The presenter or an assistant to the presenter could then make a request to the proposed inference system such as "modify the image on slide 20 which has not yet been presented" in order to make the audience feel the sentiment "excitement".

In the following, additional embodiments of the proposed concept—applicable for the training method as well as for the training system—will be described.

According to a further developed embodiment of the training method, the conditional data modification may also comprise generating new data. In such an embodiment, the characteristic data sample may have a sort-of artificial source. Instead of collecting such data from, e.g., social media sources, emails and the like, the characteristic data sample may be selected specifically for the purpose of generating new data as output during the prediction/inference phase. In this case, the input property graph is also not derived from observed data relationships of the real-like corrector restricted to our samples, but may be generated with a specific purpose in order to influence what kind of new data, e.g., modified data samples, may be generated. This may give the proposed concept a further degree of freedom in the way modified data samples may be generated.

It shall also be mentioned that the effect of generating new data—e.g., conditional data generation—may also play an interesting role during inference.

According to an advantageous embodiment of the training method, the encoder may be a convolutional neural network (CNN) and wherein the decoder may also be a convolutional neural network. Thereby, a number of input nodes of the decoder may be equal or greater than the sum of dimensions of the embedding vector and the modification vector. This condition may be applicable to both, the training method and the inference method. It should also be mentioned that the encoder and decoder CNN may in particular be a deep convolutional neural network. Hence, the known technology of deep convolutional neural networks may be repurposed here for the specific task of modifying input sample data using a modification vector injected in-between the encoder and decoder.

According to a preferred embodiment of the training method, the input property graph may be a knowledge graph—in particular comprising nodes and connecting edges—which is describable in Resource Description Framework (RDF) nomenclature. This has been proven to be an effective method to describe knowledge graphs which may also be processed computational efficiently. This nomenclature may be used for the training method as well as for the inference method. However, this is not a strong limitation. The way the input property graph is built may be different in the training phase if compared to the inference phase. However, it should be ensured that the modification vector should be built for the same target room. Furthermore, numerous methods may be used for building the input property graph, as described in more detail below in the context of FIG. 3.

According to a useful embodiment of the training method, the raw data may have one type or data type selected out of the group comprising an image, a text document, an audio stream, a video stream, and an infographic. Hence, the proposed concept may allow a large variety of different input data types of originating from a large variety of sources. The mentioned data types may thereby capture every expressive aspect of a human being. This may allow a broad spectrum of different modified data samples in order to address a large variety of different sentiments to be triggered.

According to a permissive embodiment of the training method, the building the input property graph may comprise hierarchically structuring the data relationships between characterial triggers, user identifiers, object identifiers and activity identifiers as well as abstract shared objects, action classes and target sentiment identifiers or target characterial trigger identifiers. The abstract shared object(s)—or potentially at least one—may be determined, selected or built based on the concept of hierarchies, for example, the hierarchy background information used which may be based on an external ontology (e.g., external to the proposed method). As an example, the abstract term "family" may be added as abstract shared object to the input property graph relating to an image as characteristic data sample showing a man, a woman and a child.

According to another advantageous embodiment of the training method, each node of the augmented input property graph may relate to a node embedding, and the modification vector may be built from a concatenation of the node embeddings (e.g., embedding vectors). In other words, for each node of the augmented input property graph, a node specific vector may be selected, determined or generated which may be used to determine the modification vector. This way, the input for the decoder of the encoder/decoder machine-learning system receives as input the embedding vector generated by the encoder, enhanced with the modification vector which is based on the data of the input property graph.

As further alternative and according to a further embodiment of the training method as well as for the inference method, the modification vector is built from an aggregation of the node embeddings using a graph neural network. Furthermore, there may exists additional ways to build the modification vector (as described below).

Although almost all embodiments are described in the context of the training method, they may also be applicable for the inference method and the related systems. However, the additional embodiments should be mentioned for the inference method and may apply equally for the related system.

According to a practical embodiment of the inference method, the modification vector built from the conditional input property graph may extend an embedding vector predicted or generated by the encoder. Furthermore, the extended embedding vector may be used as input for the decoder to generate the output of the encoder/decoder combination machine-learning system. In case of the inference method, the modification vector may also comprise a specific request in order to influence the generation/prediction of the output of the decoder, or the modified data sample in a specific way. This may, e.g., be a query/request to generate a modified data sample triggering "excitation", "peace of mind" or other positive sentiments in order to influence a person's behavior in a desired way (e.g., by a specific product) in target group specific advertising.

According to another advantageous embodiment of the inference method, a dimension of the vector of the augmented input property graph may be smaller than a dimension of the embedding, in particular the embedding vector generated by the encoder. This may limit the influence the modification vector has on the embedding which goes back to the characteristic input data. This way, it may be ensured that only modifications in context may be made to the characteristic data samples in order to keep the appearance within the scope of people's experience background and not to distract them or provoke rejection because of generated data which may be completely out of scope.

This condition for the dimension of the vector relating to the augmented input property graph and the embedding vector may be a good boundary condition for the training method as well as for the inference method.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

Figure 7:
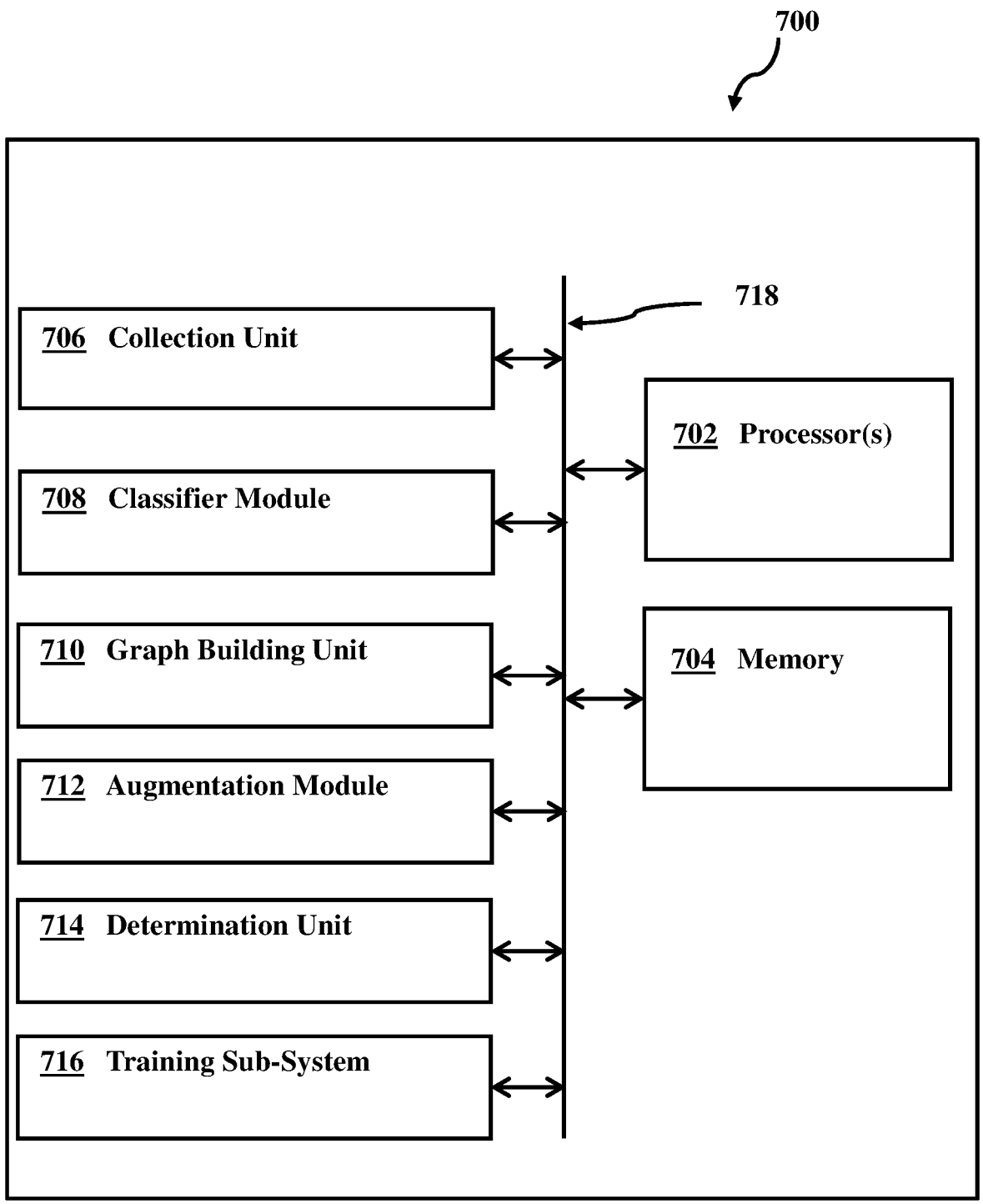
FIG. 7 shows a block diagram of an embodiment of the proposed training system for conditional data modification and portions of a related inference system, in accordance with embodiments of the present disclosure.

FIG. 7 shows a block diagram of an embodiment of the training system 700 for conditional data modification and a related inference system. The training system comprises a processor 702 and a memory 704, communicatively coupled to the processor, wherein the memory 704 stores program code portions that enable the processor 704 when executed. The processor 704 may be enabled to gather raw data using collection unit 706. The raw data may comprise a plurality of characteristic data samples of a target user group. The processor 704 may categorize, using classifier module 708, the plurality of characteristic data samples. In embodiments, the characteristic data samples the classifier module 708 may classify/categorize the plurality of characteristic data samples into a plurality of user-related classes and triggers. The processor 704 may build, using a graph building unit 710, an input property graph for each characteristic data sample. The input property graph may include data relationships between characterial triggers, user identifiers, object identifiers and activity identifiers.

The processor may be further enabled to augment, using augmentation module 712, the input property graph by a concept of hierarchies. The augmentation module 712 may build an augmented input property graph. Using determination unit 714, a modification vector from the augmented input property graph may be determined. The training subsystem 716 may train the encoder/decoder combination in such a way that is used in machine-learning systems.

In embodiments, the characteristic data samples may be used as input data for the encoder to generate an embedding vector. Additionally, the embedding vector and the modification vector may be subsequently used as input for the decoder to build a trained machine-learning generative model. The output may be a modified data sample relating to one of the characteristic data samples. A model optimization process for the machine-learning model may use target modified samples as ground truth relating pairwise to the modified data samples of the output of the machine-learning generative model under training.

In embodiments, the related inference system may have an equivalent structure compared to the training system. However, the inference system may already comprise the trained machine-learning model. As such, the inference system may be, but does not have to be, identical to the training system. The computing components of the inference system may be different if compared to the training system. In some embodiments, the training of the machine-learning model may require more computing resources. In these embodiments, the inference system may have an underlying computing system with lower performance if compared to the training system.

It shall also be mentioned that all functional units, modules and functional blocks of the training system, and equivalently to the inference system, may be communicatively coupled to each other for signal or message exchange in a selected 1:1 manner. This may apply especially to the processor 702, the memory 704, the collection unit 706, the classifier module 708, the graph building unit 710, the augmentation module 712, the determining unit 714, and the training sub-system 716. Alternatively, the functional units, modules and functional blocks can be linked to a system internal bus system 718 for a selective signal or message exchange.

Figure 8:
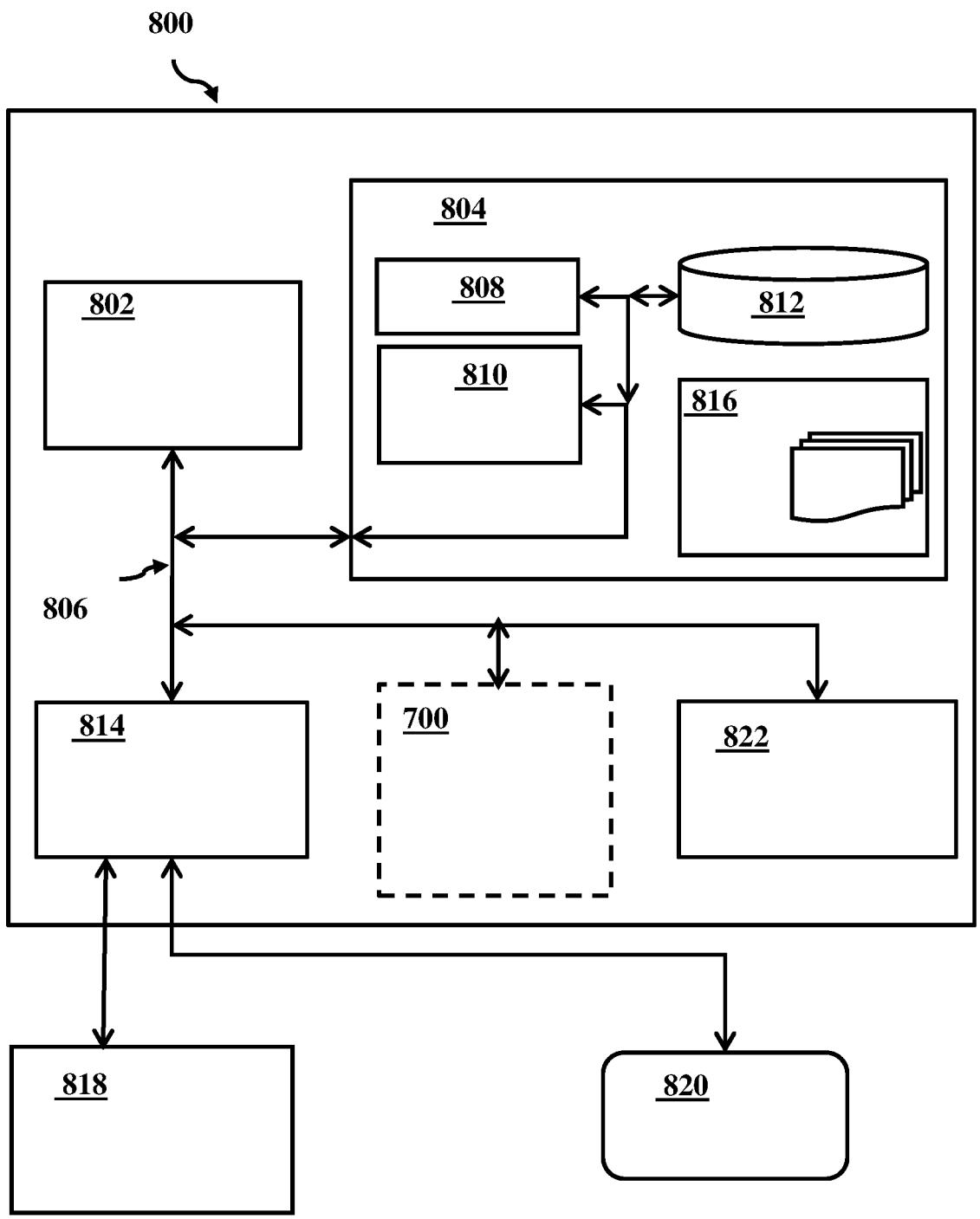
FIG. 8 shows an embodiment of a computing system comprising, in accordance with embodiments of the present disclosure.

Embodiments of the disclosure may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the disclosure described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the disclosure.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the disclosure, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the training system 700 for conditional data modification and, alternatively, a related inference system may be attached to the bus system 806.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms a, an, and they are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

What is claimed is:

1. A computer-implemented method for conditional data modification, the method comprising:
   gathering raw data comprising a plurality of characteristic data samples of a target user group;
   categorizing the characteristic data samples into a plurality of user-related classes and triggers;
   building an input property graph for each characteristic data sample, wherein the input property graph comprises data relationships associated with characterial triggers, user identifiers, object identifiers and activity identifiers;
   augmenting the input property graph by a concept of hierarchies;
   determining a modification vector from the augmented input property graph;
   training an encoder/decoder combination machine-learning system comprising a machine learning generative model that is a combined model of an encoder and a decoder, wherein the training comprises:
      inputting the characteristic data samples into the encoder to generate an embedding vector;
      inputting the embedding vector and the modification vector into the decoder to build the machine-learning generative model,
      wherein the machine-learning generative model is configured to output modified data samples relating to the characteristic data samples; and
      optimizing the machine-learning generative model using target modified samples as ground truth relating pairwise to the modified data samples; and
   receiving, at the trained encoder/decoder combination machine-learning system, inference input data and a conditional input property graph, wherein the conditional input property graph includes a request for a target characterial trigger.

2. The method according to claim 1, further comprising: generating new data during the conditional data modification.

3. The method according to claim 1, wherein the encoder and the decoder are convolutional neural networks (CNNs), and
wherein a number of input nodes of the decoder is greater than a sum of dimensions associated with the embedding vector and the modification vector.

4. The method according to claim 1, wherein the input property graph is a knowledge graph which is associated with a Resource Description Framework (RDF) nomenclature.

5. The method according to claim 1, wherein the raw data is a type selected from the group consisting of an image, a text document, an audio stream, a video stream, and an infographic.

6. The method according to claim 1, wherein the augmenting comprises hierarchically structuring the data relationships.

7. The method according to claim 6, wherein each node of the augmented input property graph relates to a node embedding, wherein the modification vector is built from a concatenation of the node embeddings, and wherein the modification vector is built from an aggregation of the node embeddings using a graph neural network.

8. The method of claim 1, further comprising:
   predicting, in response to the receiving, output data of a same data representation as the inference input data.

9. The method according to claim 8, wherein the modification vector associated with the conditional input property graph extends the embedding vector predicted by the encoder to generate an extended embedding vector, wherein the extended embedding vector is input to the decoder to generate the output of the encoder/decoder combination machine-learning system.

10. The method according to claim 8, wherein a dimension of a vector associated with the augmented input property graph is smaller than a dimension of the embedding vector.

11. A system for conditional data modification, the training-system comprising:
    a memory; and
    a processor in communication with the memory, the processor being configured to perform operations comprising:
       gathering raw data comprising a plurality of characteristic data samples of a target user group;
       categorizing the characteristic data samples into a plurality of user-related classes and triggers;
       building an input property graph for each characteristic data sample, wherein the input property graph comprises data relationships associated with characterial triggers, user identifiers, object identifiers and activity identifiers;
       augmenting the input property graph by a concept of hierarchies, whereby an augmented input property graph is built;
       determining a modification vector from the augmented input property graph;
       training an encoder/decoder combination machine-learning system comprising a machine learning generative model that is a combined model of an encoder and a decoder, wherein the training comprises:
  inputting the characteristic data samples into the encoder to generate an embedding vector;
  inputting the embedding vector and the modification vector into the decoder to build the machine-learning generative model, wherein the machine-learning generative model is configured to output modified data samples relating to the characteristic data samples; and
  optimizing the machine-learning generative model using target modified samples as ground truth relating pairwise to the modified data samples; and
  receiving, at the trained encoder/decoder combination machine-learning system, inference input data and a conditional input property graph, wherein the conditional input property graph includes a request for a target characterial trigger.

12. The system according to claim 11, further comprising: generating new data during the conditional data modification.

13. The system according to claim 11, wherein the encoder and the decoder are convolutional neural networks (CNNs), wherein a number of input nodes of the decoder is equal to a sum of dimensions associated with the embedding vector and the modification vector.

14. The system according to claim 11, wherein the input property graph is a knowledge graph associated with a Resource Description Framework (RDF) nomenclature.

15. The system according to claim 11, wherein the raw data is a type selected from the group consisting of an image, a text document, an audio stream, a video stream, and an infographic.

16. The system according to claim 11, wherein the augmenting comprises hierarchically structuring the data relationships, and wherein the input property graph further comprises data relationships associated with abstract shared objects, action classes, target sentiment identifiers, and target characterial trigger identifiers.

17. The system according to claim 16, wherein each node of the augmented input property graph relates to a node embedding, and wherein the modification vector is built from a concatenation of the node embeddings.

18. The system of claim 11, further comprising:
  predicting, in response to the receiving, output data of a same data representation as the inference input data.

19. A computer program product for conditional data modification, the computer program product comprising a computer readable storage medium having program instructions embodied therewith, the program instructions executable by a processor to cause the processors to perform a function, the function comprising:
  gathering raw data comprising a plurality of characteristic data samples of a target user group;
  categorizing the characteristic data samples into a plurality of user-related classes and triggers;
  building an input property graph for each of the characteristic data samples, wherein the input property graph comprises data relationships associated with characterial triggers, user identifiers, object identifiers and activity identifiers;
  augmenting the input property graph by a concept of hierarchies;
  determining a modification vector from the augmented input property graph;
  training an encoder/decoder combination machine-learning system comprising a machine-learning generative model that is a combined model of an encoder and a decoder, wherein the training comprises:
    inputting the characteristic data samples into the encoder to generate an embedding vector;
    inputting the embedding vector and the modification vector for the decoder to build the machine-learning generative model, wherein
  the machine-learning generative model is configured to output modified data samples relating to the characteristic data samples; and
    optimizing the machine-learning generative model using target modified samples as ground truth relating pairwise to the modified data samples;
  receiving, at the trained encoder/decoder combination machine-learning system, inference input data and a conditional input property graph, wherein the conditional input property graph includes a request for a target characterial trigger; and
  predicting, in response to the receiving, output data of a same data representation as the inference input data.

20. The method according to claim 6, wherein the input property graph further comprises data relationships associated with abstract shared objects, action classes, target sentiment, and target characterial trigger identifiers.

* * * * *